(12) United States Patent  
Palecek

(10) Patent No.: US 7,584,504 B2
(45) Date of Patent: Sep. 1, 2009

(54) EMBEDDING A SECURITY SUPPORT PROVIDER INTERFACE IN A COMMUNICATION CLASS LIBRARY

(75) Inventor: Lowell D. Palecek, White Bear Township, MN (US)

(73) Assignee: Unisys Corporation, Blue Bell, PA (US)

( * ) Notice: Subject to any disclaimer, the term of this patent is extended or adjusted under 35 U.S.C. 154(b) by 836 days.

(21) Appl. No.: 10/848,900

(22) Filed: May 19, 2004

(65) Prior Publication Data

US 2005/0262359 A1 Nov. 24, 2005

(51) Int. Cl.
*H04L 9/32* (2006.01)
(52) U.S. Cl. .................... 726/10; 713/172; 713/185; 713/186; 726/9; 726/20; 709/225; 709/229
(58) Field of Classification Search .................. 719/315; 703/21; 717/106, 114, 116; 709/219, 230, 709/225, 229; 713/185–186, 172; 715/207, 715/234; 726/1, 14, 9, 20
See application file for complete search history.

(56) References Cited

U.S. PATENT DOCUMENTS

| 5,739,432 | A | * | 4/1998 | Sinha ........................... 73/579 |
| 5,822,521 | A | * | 10/1998 | Gartner et al. .............. 709/230 |
| 6,012,090 | A | * | 1/2000 | Chung et al. ................. 709/219 |
| 6,282,652 | B1 | * | 8/2001 | Scheifler ...................... 726/14 |
| 6,341,353 | B1 | * | 1/2002 | Herman et al. ................. 726/5 |

* cited by examiner

*Primary Examiner*—Thanhnga B Truong
(74) *Attorney, Agent, or Firm*—Charles A. Johnson

(57) ABSTRACT

An apparatus for and method of improving the efficiency of service request/response activity requiring security functions. A security facility, such as Security Support Provider Interface is embedded in a communication class library which controls the communication between client and server applications. A context token is associated with the service request which specifies the security functions to be provided in honoring that particular request without any particular attention by either client or server application, as the security functions are exclusively concerned with the communication process rather than the service request/response activity.

9 Claims, 7 Drawing Sheets

| Message # | Description | Fig. 16 Reference |
|---|---|---|
| 1 | After the connection has been accepted, send the caller's initial message. This message is not encrypted. | 516 |
| 2 | If authorization is requested and agreed by the server, tell client that the server is ready for its security context. Otherwise, go to step 6. | 518 |
| 3 | Call the SSPI InitializeSecurityContext function to get a context token. | 520 |
| 4 | Send the client context token to the server. | 522 |
| 5 | Call the SSPI AcceptSecurityContext function with the buffer received from the client. | 524 |
| 6 | THis step depends on the SSP. Set the CONTEXT_TOKEN flag if AcceptSecurityContext provided an output buffer. If it returned SEC_E_OK, impersonate the client if so requested by the server consumer, and set the CONNECTION_ACCEPTED flag. | 526 |
| 7 | Since vMessage1 is sent unencrypted, the client may provide a second message to send encrypted. | 528 |
| 8 | Open attaches the server response to the pMessage2 parameter as output. The consumer client should check both the return value from Open and the contents of pMessage2 if used. | 530 |

FIG. 5

EMBEDDING A SECURITY SUPPORT PROVIDER INTERFACE IN A COMMUNICATION CLASS LIBRARY

CROSS REFERENCE TO CO-PENDING APPLICATIONS

U.S. patent application No. 09/188,629, filed Nov. 9, 1998, and entitled, "Cool ICE data Wizard", now U.S. Pat. No. 6,295,531; U.S. patent application No. 09/188,649, filed Nov. 9, 1998, and entitled, "Cool ICE Column Profiling"; U.S. patent application No. 10/848,473, filed May 19, 2004, and entitled, "Interface Cool ICE OLEDB Consumer Interface"; and U.S. patent application No. 09/188,725, filed Nov. 9, 1998, and entitled, "Cool ICE State Management", now U.S. Pat. No. 6,324,639, are commonly assigned applications.

BACKGROUND OF THE INVENTION

1. Field of the Invention

The present invention generally relates to data base management systems and more particularly relates to enhancements for improving the efficiency of secure access to data base management systems.

2. Description of the Prior Art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation and on an industry compatible personal computer under a Windows Server operating system, provides a way for clients to partition data bases into structures called filing cabinets and drawers, as a way to offer a more tangible format. The BIS (Business Information System) data base manager utilizes various predefined high-level instructions whereby the data base user may manipulate the data base to generate human-readable data presentations called "reports". The user is permitted to prepare lists of the various predefined high-level instructions into data base manager programs called "BIS Runs":. Thus, users of the Classic MAPPER system may create, modify, and add to a given data base and also generate periodic and aperiodic reports using various BIS Runs.

Within these highly complex network and multi-legacy environments, standardization of security profiling becomes a particular problem. It is known in the prior art to utilize Security Support Provider Interface (SSPI) available from Microsoft. Unfortunately in the current environment, this means that the client and server must ordinarily first establish their connection through a communications library (e.g., sockets). The system then requires a multi-step SSPI handshake to authenticate both client and server. Following the mutual identification, the SSPI functions must be individually called to protect the security and integrity of each message.

SUMMARY OF THE INVENTION

The present invention overcomes the disadvantages of the prior art by providing a method of and apparatus for improving the efficiency of client server communication within a secure environment. The preferred mode of the present invention embeds use of a commercial security facility, such as Microsoft Security Support Provider Interface (SSPI) within a communications class library, so that the communications library supports peer authentication, client impersonation, and message signature and encryption. It is this embedded SSPI which provides the security features for the client/server relationship. The client and server can then authenticate each other, and sign or encrypt messages between them.

In the preferred approach, the use of SSPI is hidden in a generic communications object. Clients and servers do not directly call any SSPI functions. The connection and authentication appear to occur in a single step, and the applications send and receive messages without concern about encryption and decryption. Applications may want to encrypt some messages but not others. The communications library provides methods to turn signing and encryption on and off.

The communications class, CDACSComm, has subclasses CDACSCommClient and CDACSCommServer for the client and server to use, respectively. It has the CDACSSecurity object embedded into it. The client application creates and initializes a CDACSCommClient application. Initialization includes the information needed to identify the server, and provides choices, with default values, for authentication and message protection.

The client then calls the Open method, with a simple message that the server can use to route the connection. (In DACS, we have three different server applications that can receive the connection from a single listener application.) The security sublibrary provided by this invention adds the authentication and encryption selections to the initial Open message.

For its part, the server application creates a CDACSCommServer object and initializes it with a token that represents a tentatively accepted client connection and its choices for authentication and message protection. At this point, the security library takes over, making sure that client and server agree on their authentication choices. It performs the steps needed to carry out the authentication, calling SSPI functions and sending messages between client and server as needed. Both the client and server applications receive a simple status back indicating whether the connection is fully established.

Once the connection is established and authenticated, the client and server applications send and receive messages as though they were plain, unencrypted text. The communications library signs or encrypts sent messages, and verifies or decrypts received messages automatically. The applications need not be aware that they are using a security sublibrary.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 5 is a table showing the description of the message utilized in FIG. 5.

DETAILED DESCRIPTION OF THE PREFERRED EMBODIMENTS

The present invention is described in accordance with several preferred embodiments which are to be viewed as illustrative without being limiting. These several preferred embodiments are based upon Unisys Intel-based hardware and Microsoft Windows operating systems, the Classic MAPPER data base management system, and the BIS/Cool ICE software components, all available from Unisys Corporation.

Figure 1:
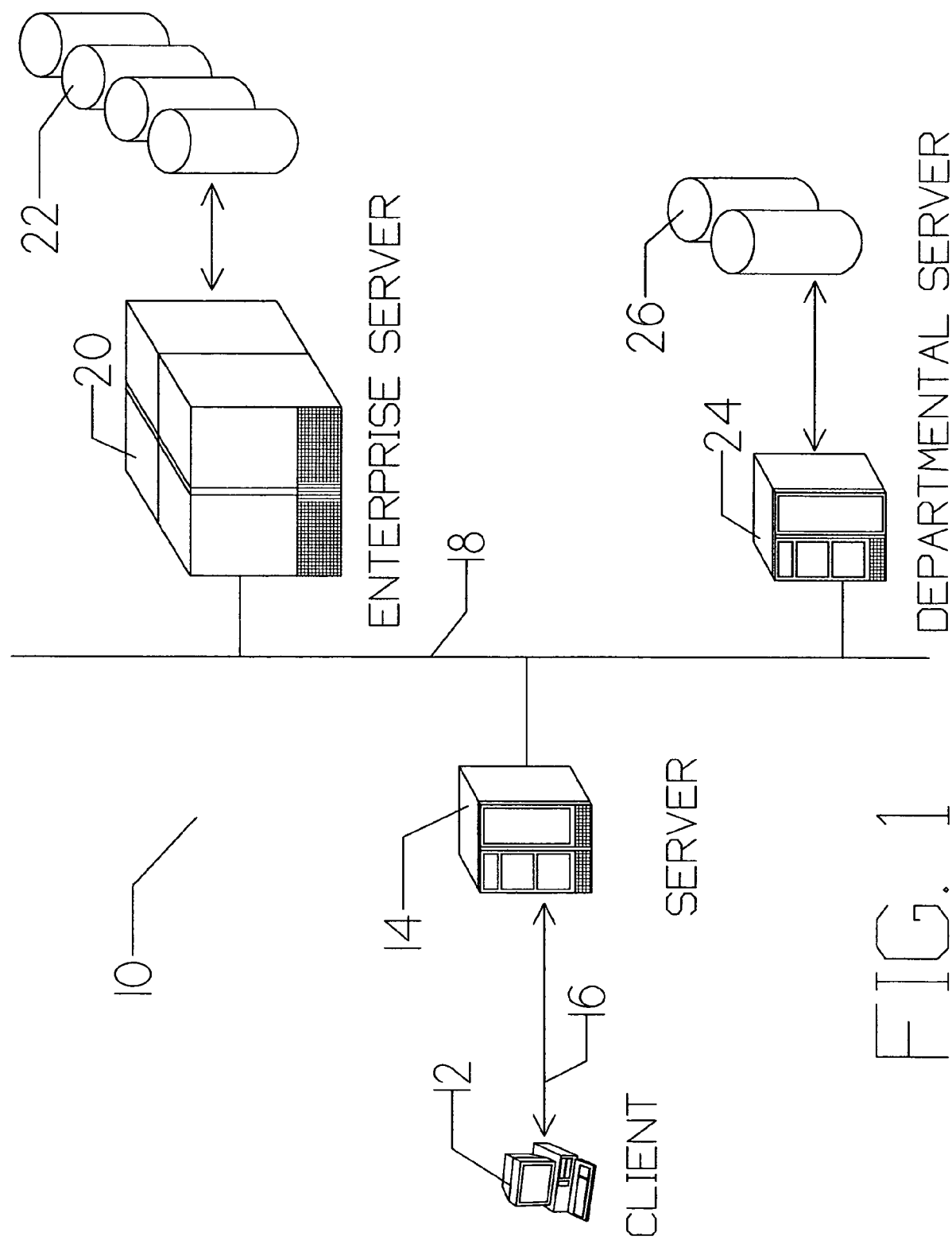
FIG. 1 is a pictographic view of the hardware of the preferred embodiment.

FIG. 1 is a pictorial diagram of hardware suite 10 of the preferred embodiment of the present invention. The client interfaces with the system via terminal 12. Preferably, terminal 12 is an industry compatible, personalized computer having a current version of the Windows operating system and suitable web browser, all being readily available commercial products. Terminal 12 communicates over world wide web access 16 using standardized HTML protocol, via Server 14.

The BIS/Cool ICE system is resident in Enterprise Server 20 and accompanying storage subsystem 22, which is coupled to Server 14 via WAN (Wide Area Network) 18. In the preferred mode, Server 14 is owned and operated by the enterprise owning and controlling the proprietary legacy data base management system. Server 14 functions as the Internet access provider for terminal 12 wherein world wide web access 16 is typically a dial-up telephone line. This would ordinarily be the case if the shown client were an employee of the enterprise. On the other hand, web server 14 may be a remote server site on the Internet if the shown client has a different Internet access provider. This would ordinarily occur if the shown client were a customer or guest.

In addition to being coupled to WAN 18, Enterprise Server 20, containing the BIS/Cool ICE system, is coupled to departmental server 24 having departmental server storage facility 26. Additional departmental servers (not shown) may be sinilarly coupled. The enterprise data and enterprise data base management service functionality typically resides within enterprise server 20, departmental server 24, and any other departmental servers (not shown). Normal operation in accordance with the prior art would provide access to this data and data base management functionality.

In the preferred mode of the present invention, access to this data and data base management functionality is also provided to users (e.g., terminal 12) coupled to Intranet 18. As explained below in more detail, server 14 provides this access utilizing the BIS/Cool ICE system.

Figure 2:
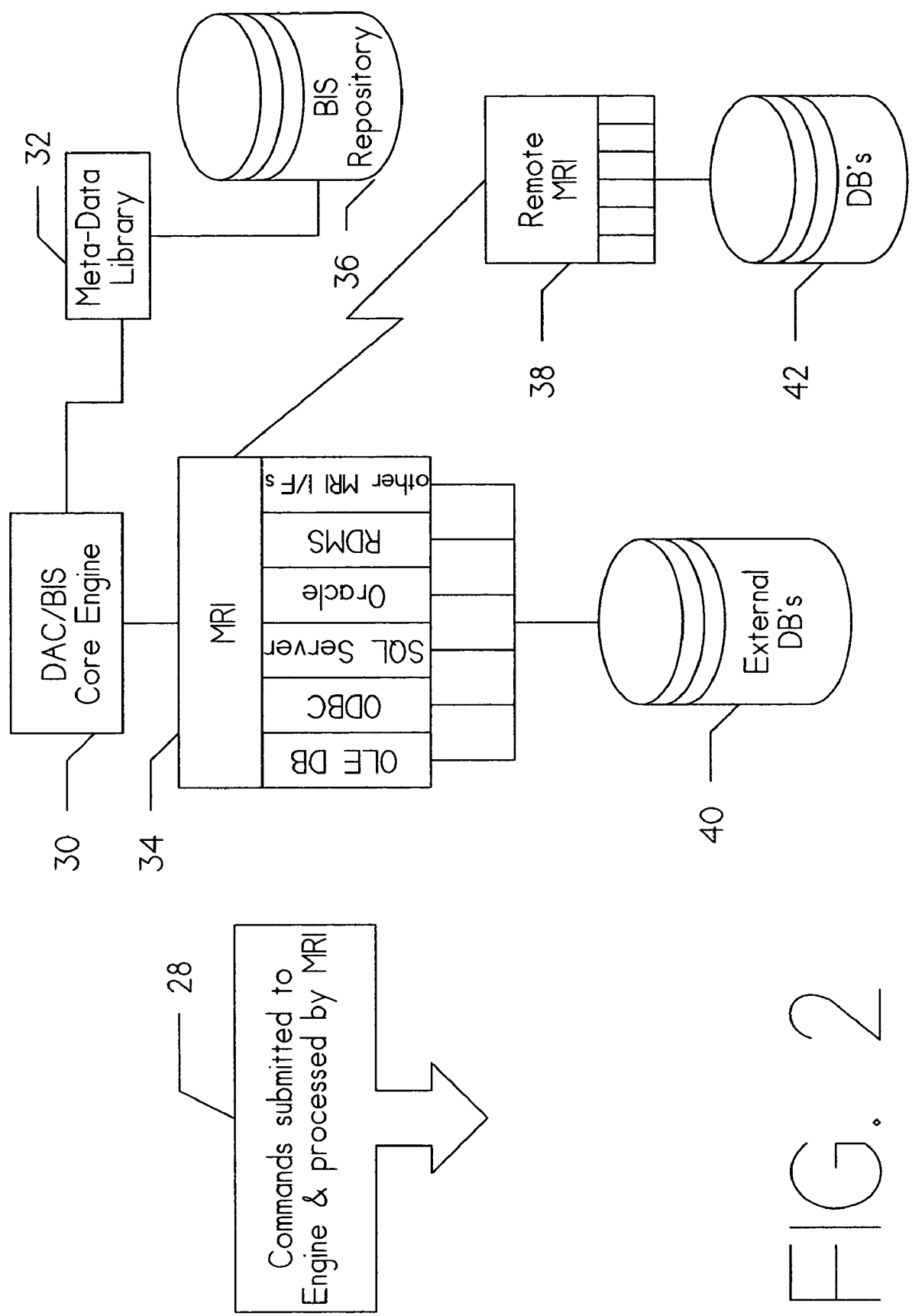
FIG. 2 is a pictorial diagram of the @SPI command process flow.

FIG. 2 is a functional diagram showing the major components of the @SPI (stored procedure interface) command process flow. This command is a part of the MRI (BIS Relational Interface) set of commands and combines many of the attributes of the previously existing @FCH (relational aggregate fetch) and @SQL (standard query language) commands. However, it is specifically targeted to executing stored procedures.

Command set 28 represents the commands defined for processing by MRI. In addition to @SPI, @FCH, and @SQL, @LGN (log on), MRI recognizes @LGF (log off), @DDI (data definition information), @RAM (relational aggregate modify), @TRC (trace relational syntax), @MQL (submit SQL syntax to a BIS data base) as the remaining commands. DAC/BIS core Engine 30 provides the basic logic for decode and execution of these commands. MRI 34 has relational access to data via the data base management formats shown to external data bases 40. In addition, MRI 34 can call upon remote MRI 38 to make similar relational access of remote data bases 42.

BIS core engine 30 executes commands utilizing meta-data library 32 and BIS repository 36. Meta-data library 32 contains information about the data within the data base(s). BIS repository 36 is utilized to store command language script and state information for use during command execution.

The @SPI command has the following basic format:
@SPI, c, d, lab, db, edsp?, action, wrap, vert 'sp-syntax', vpar1 . . . ,vparN, typ1, . . . typN.

Fields c and d refer to the cabinet and drawer, respectively, which hold the result. The lab field contains a label to go to if the status in the vstat variable specifies other than normal completion. The required db field provides the data base name. The edsp? field specifies what is to be done with the result if an error occurs during execution.

The sub-field labeled action defines what action is to be performed. The options include execution, return of procedures lists, etc. The wrap sub-field indicates whether to truncate or wrap the results. The vert sub-field defines the format of the results. The name of the stored procedure is placed into the sp-syntax field. The vpar provides for up to 78 variables that correspond to stored procedure parameters. Finally, the typ field defines the type of each stored procedure parameter.

Figure 3A:
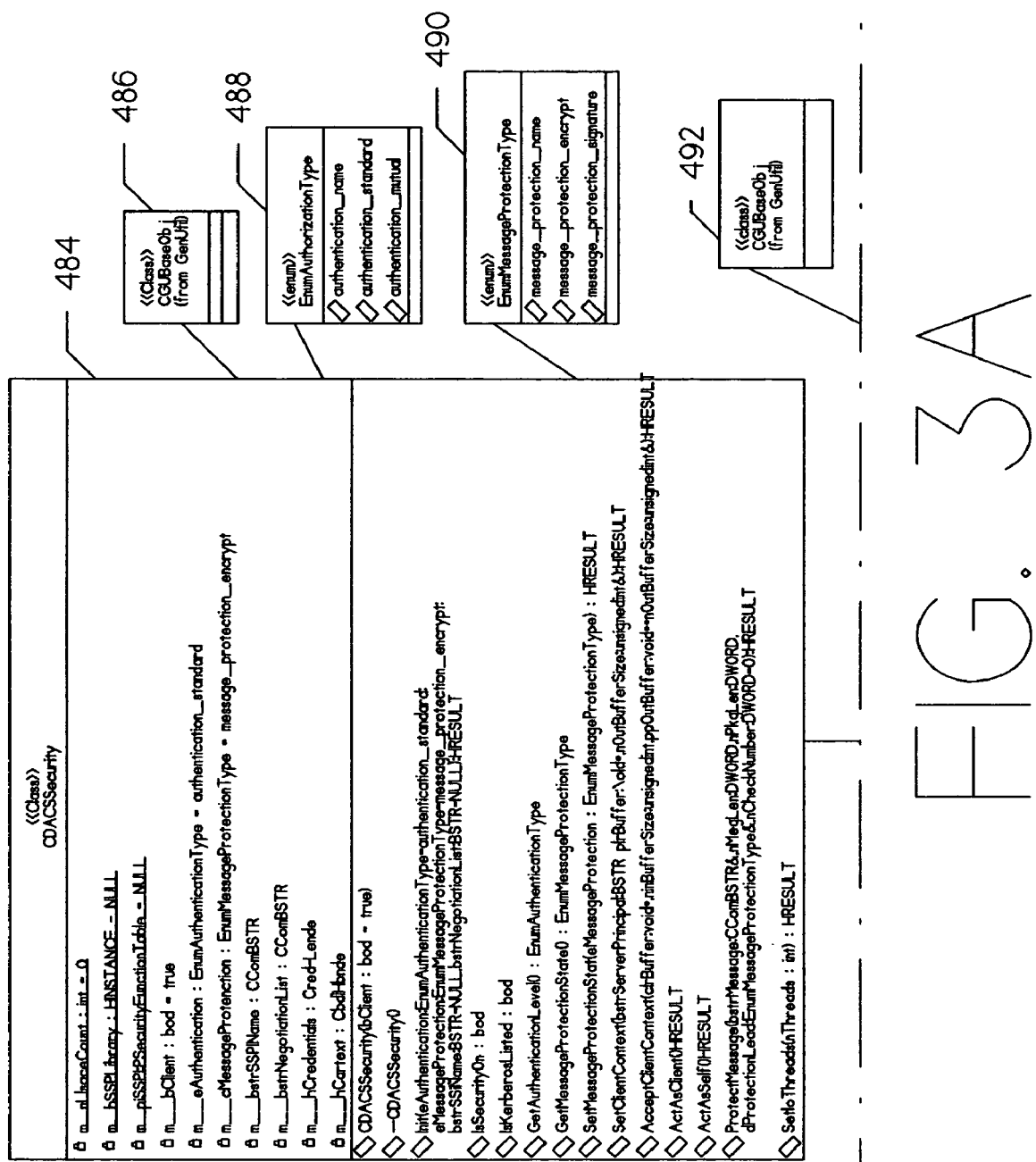
FIG. 3, consisting of FIG. 3A, FIG. 3B, and FIG. 3C, is a main class diagram showing embedding of the preferred SSPI functions.
Figure 3B:
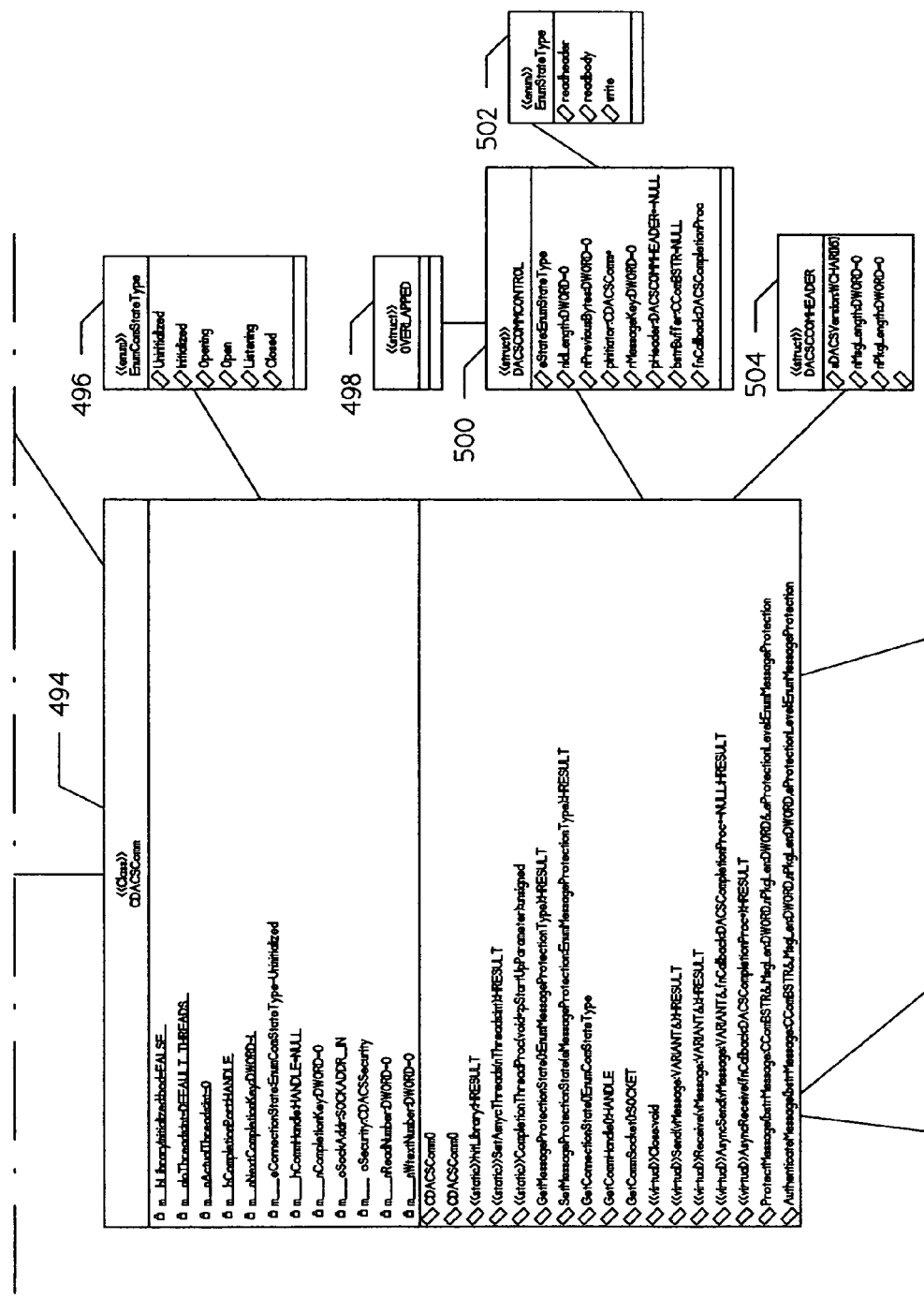
Figure 3C:
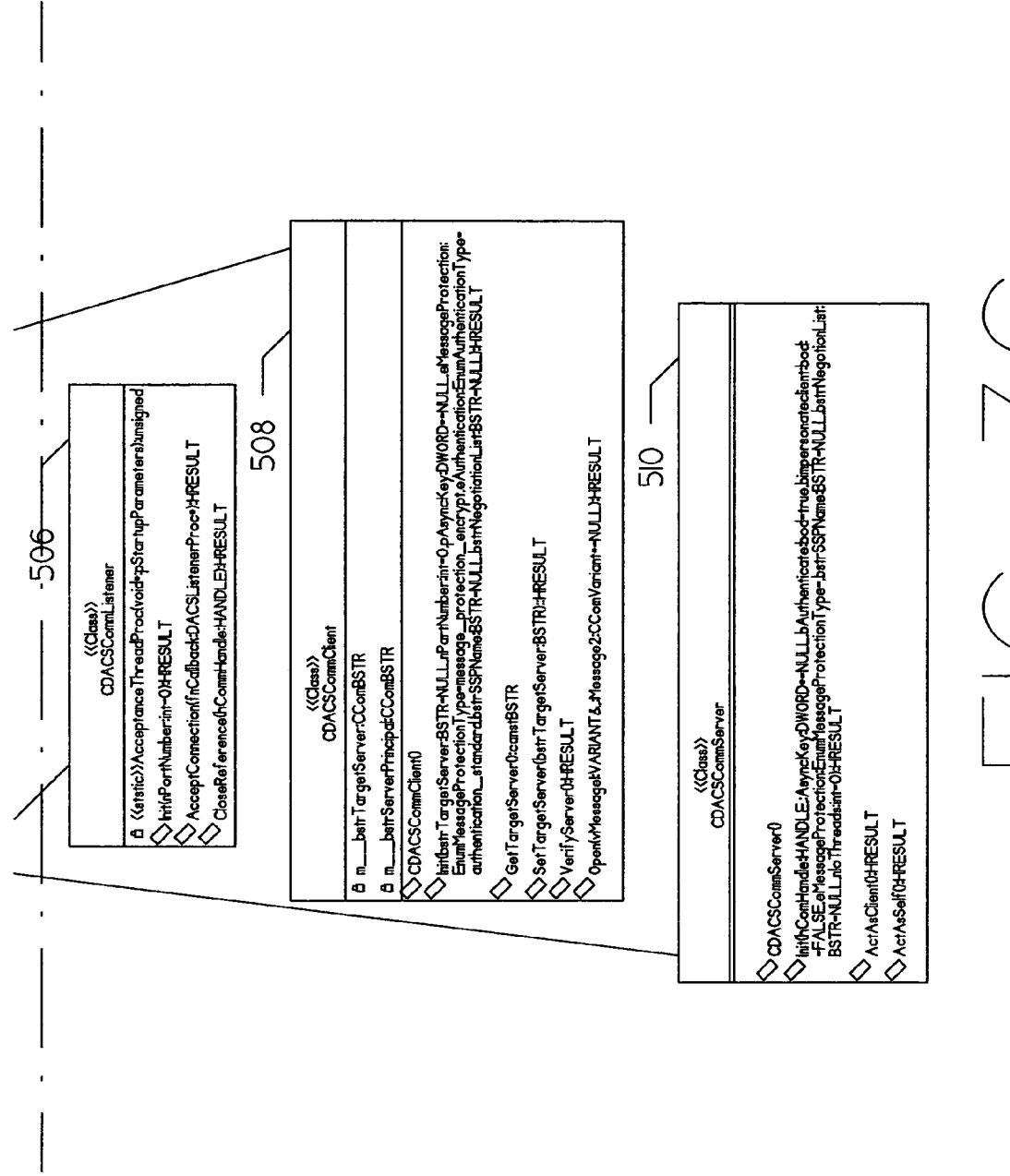

FIG. 3 containing FIG. 3A, FIG. 3B, and FIG. 3C, provides a detailed class diagram for the preferred mode of the present invention. Turning to FIG. 3C, it can be seen that the communication is initiated by the listener via the CommListener object 506, the client via the CommClient object 508, or the server via the CommServer object 510. These three objects are refinements of Comm object 494, as shown in FIG. 3B. CommState object 496 maintains the state of the particular communication. Control is provided by object 500 which also contains objects 498 and 502. The communications header object is element 504. Error handling functions are found at object 492 (see also FIG. 3A).

FIG. 3A shows the objects associated with the specific security functions via object 484. Error handling functions are found at object 486. Object 488 provides authorization type. Message protection types are defined by object 490.

Figure 4:
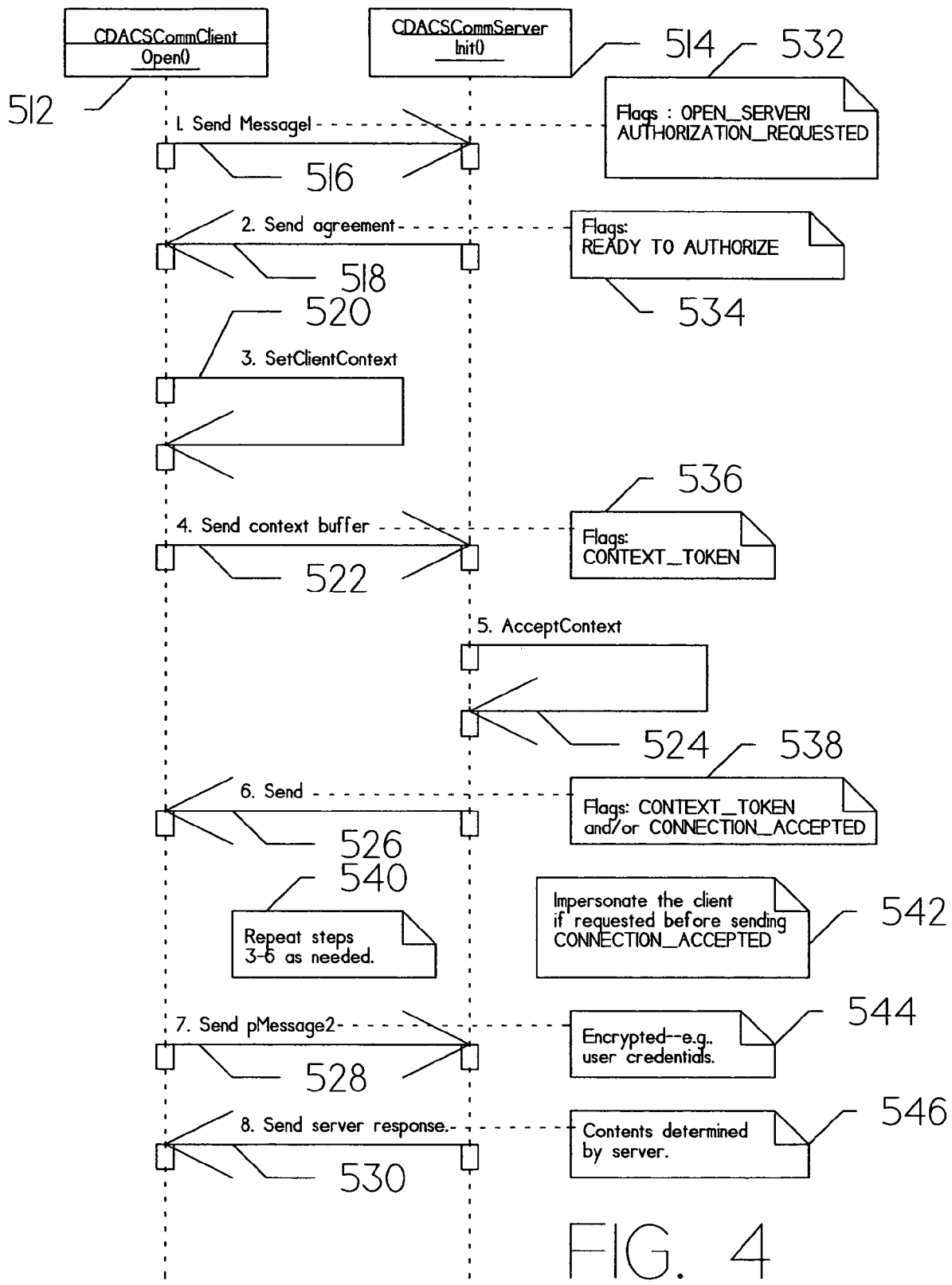
FIG. 4 is a detailed flow diagram showing an authorizing connection.

FIG. 4 is a detailed schematic view of the process for authorizing a connection. Element 512 represents the communication client and element 514 represents the communication server. First message 516 is the initial request from client to server in the format shown as element 532.

Message 518 provides the initial response from the server in the format of element 534. Message 520 occurs within the client to obtain a context token. Message 522, in the format of element 536, is sent to the server to provide the context token. The server internalizes the context token via message 524. The status of the communication (e.g., accepted, impersonate client, etc.) is sent from server to client via message 526 in the format of element 538. Element 542 indicates that the client is impersonated as necessary. If required, element 540 shows repeat of steps 3-6.

Message 528 is a second message to the server from the client. It is in the format of element 544. Message 530 provides the server response in the format of element 546.

FIG. 5 is a listing and description of all of the messages and corresponding operations shown within FIG. 4.

Having thus described the preferred embodiments of the present invention, those of skill in the art will be readily able to adapt the teachings found herein to yet other embodiments within the scope of the claims hereto attached.

We claim:

1. A method of handling a service request from a client application to a service application, comprising, a. embedding a security facility within a communication class library;
b. generating a service request within a user terminal using said client application;
c. transferring said service request from said client application to said service application located within a computer which is different from said user terminal;
d. receiving said service request by said service application;
e. honoring said service request by said service application;
f. automatically implementing security functions from said embedded security facility during said step which honors said service request; and
g. having a context token transferred from said client to said service application identifying required security functions from said embedded security facility.

2. The apparatus of claim 1 wherein said security facility further comprises an encryption object.

3. The apparatus of claim 2 wherein said security facility further comprises security support provider interface.

4. The apparatus of claim 3 wherein said security facility further comprises a decryption object.

5. The apparatus of claim 4 wherein said user terminal is responsively coupled to a data base management system via a publically accessible digital data communication network and wherein said service application is located within said data base management system.

6. A method according to claim 1 wherein said transferring step further comprises transferring said service request to said service application via a publically accessible digital data communication network.

7. A method according to claim 6 wherein said client application is located within said user terminal.

8. A method according to claim 7 further comprising a data base management system wherein said service application is located within said data base management system.

9. The data processing system according to claim 8 wherein said context token is transferred from said client application to said service application along with said service request.

* * * * *